Patented Sept. 13, 1949

2,482,063

UNITED STATES PATENT OFFICE 2,482,063

PREPARATION OF ORGANIC PHOSPHATES

Ingenuin Hechenbleikner, Norwalk, Conn., assignor to American Cyanamid Company, New York, N. Y., a corporation of Maine No Drawing. Application December 26, 1947, Serial No. 794,117

6 Claims. (Cl. 260—461)

The present invention relates to a method of preparing chlorothiophosphate esters which are adapted for various uses, more particularly as intermediates in the production of insecticides, rodenticides, fungicides, flotation agents, petroleum additives, corrosion inhibitors, plasticizers, and flame retardants.

These esters may be represented by the general formula

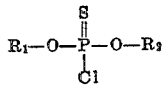

in which $R_1$ and $R_2$ are chosen from the group consisting of alkyl, aralkyl, and aryl radicals. These R's, being alike or different, represent both the straight chain and branch chain, the saturated and unsaturated, and the cycloaliphatic hydrocarbon radicals. The $R_1$ and $R_2$ radicals may also carry halogen substituents, particularly chlorine and bromine. Typical examples of these radicals are methyl, ethyl, n-propyl- isopropyl, isobutyl, sec.-amyl, n-hexyl, 2-ethylhexyl, n-octyl, n-decyl, n-dodecyl, oleyl, cetyl, ceryl, allyl, bromomethyl, 2-chloroethyl, cyclohexyl, benzyl, phenyl, and 4-chlorophenyl.

It has been discovered that a chlorothiophosphate of the above type may be readily prepared by reacting a bis(thiophosphono) sulfide of the general formula

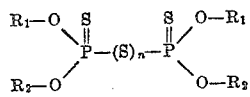

in which $R_1$ and $R_2$ have the meaning shown above, and $n$ is a whole number, with a chlorinating agent selected from the group consisting of chlorine, sulfur monochloride, and sulfur dichloride.

A typical reaction in which bis(O,O-diethyl thiophosphono) disulfide is reacted with chlorine to produce O,O-diethyl chlorothiophosphate may be illustrated as follows:

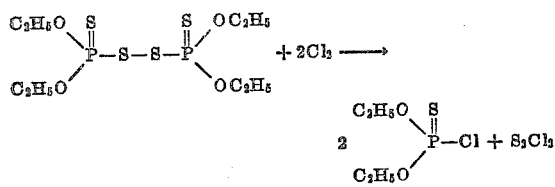

Suitable inert organic solvents may be employed in the process. Such solvents include carbon tetrachloride, chloroform, benzene, toluene, xylene, chlorobenzene, tetrachloroethane, methylene chloride, ethylene dichloride, and the like.

The reaction is preferably carried out at a temperature within the range of from about 0° to 60° C. However, temperatures outside this range may be employed depending upon the type of reactants utilized. Cooling means may be necessary, since the reaction is somewhat exothermic, particularly in the early stages.

The invention is further illustrated by the following examples in which the parts are by weight.

Example 1

A mixture consisting of 100 parts of bis(O,O-diethyl thiophosphono) trisulfide dissolved in 375 parts of carbon tetrachloride was stirred and cooled in an ice bath. 44.4 parts of chlorine were distilled into the mixture during a period of about one hour, the temperature of the reaction mixture being maintained between 10° and 15° C. The cold solution was then mixed with a liter of ice water and stirred for one-half hour. The mixture was filtered and the filtrate allowed to stratify into two layers. The lower layer was removed and distilled under reduced pressure. 73 parts of O,O-diethyl chlorothiophosphate, a colorless liquid boiling at 49°-50° C./1 mm., were obtained in a yield of 78% based on the weight of the bis(O,O-diethyl thiophosphono) trisulfide used.

Example 2

The procedure of Example 1 was employed using 185 parts of bis(O,O-diethyl thiophosphono) disulfide, 375 parts of carbon tetrachloride, and 71 parts of chlorine. 135 parts (72% yield) of O,O-diethyl chlorothiophosphate were obtained.

Example 3

A mixture consisting of 108.5 parts of bis (O,O-diethyl thiophosphono) tetrasulfide dissolved in 375 parts of carbon tetrachloride was stirred and cooled in an ice bath. 154 parts of sulfur dichloride were slowly added, while the temperature of the mixture was maintained between 10° and 150° C. After standing at room temperature for one hour, the reaction mixture was distilled under reduced pressure to remove the carbon tetrachloride. Further distillation gave 100 parts of sulfur monochloride distilling at 45°-50° C./35 mm., followed by 80 parts (85% yield) of O,O-diethyl chlorothiophosphate distilling at 65° C./5 mm.

Example 4

52.6 parts of sulfur monochloride were gradually added to a well-agitated solution of 85 parts of bis(O,O-diethyl thiophosphono) disulfide in 150 parts of carbon tetrachloride. At the end of one-half hour, the temperature of the mixture had risen to 50° C. and sulfur began to separate. After standing for 24 hours, the clear liquid was decanted from a semi-solid mass of sulfur and distilled under reduced pressure to remove the carbon tetrachloride. Further distillation gave 75 parts (86% yield) of O,O-diethyl-chlorothiophosphate.

In like manner other alkyl, aralkyl, and aryl chlorothiophosphate esters may be prepared by reacting the corresponding bis(thiophosphono) sulfide with a chlorinating agent selected from the group consisting of chlorine, sulfur monochloride, and sulfur dichloride.

While the invention has been described with particular reference to specific embodiments, it is to be understood that it is not to be limited thereto, but is to be construed broadly and restricted solely by the scope of the appended claims.

I claim:

1. A method of preparing an organic chlorothiophosphate of the general formula

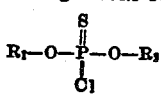

in which $R_1$ and $R_2$ are chosen from the group consisting of alkyl, aralkyl, and aryl radicals, which includes the step of reacting a bis(thiophosphono) sulfide of the general formula

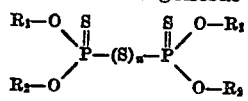

in which $R_1$ and $R_2$ are chosen from the group consisting of alkyl, aralkyl, and aryl radicals, and $n$ is a whole number, with a chlorinating agent selected from the group consisting of chlorine, sulfur monochloride, and sulfur dichloride.

2. The method of claim 1 in which the reaction is carried out at a temperature within the range of from about 0° to 60° C.

3. The method of claim 1 in which the reaction is carried out in the presence of an inert organic solvent.

4. A method of preparing a dialkyl chlorothiophosphate of the formula

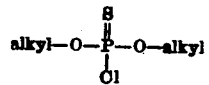

which includes the step of reacting a bis(dialkyl thiophosphono) sulfide of the formula

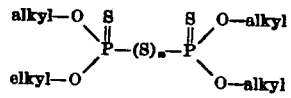

in which $n$ is a whole number with chlorine.

5. A method of preparing a dialkyl chlorothiophosphate of the formula

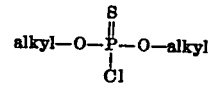

which includes the step of reacting a bis(dialkyl thiophosphono sulfide of the formula

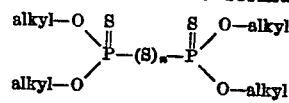

in which $n$ is a whole number with sulfur monochloride.

6. A method of preparing a dialkyl chlorothiophosphate of the formula

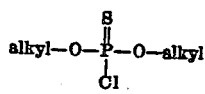

which includes the step of reacting a bis(dialkyl thiophosphono) sulfide of the formula

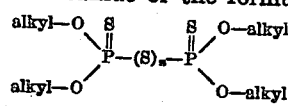

in which $n$ is a whole number with sulfur dichloride.

INGENUIN HECHENBLEIKNER.

REFERENCES CITED

The following references are record in the file of this patent:

UNITED STATES PATENTS

| Number | Name | Date |
|---|---|---|
| Re. 20,411 | Romieux et al. | June 15, 1937 |
| 2,060,815 | MacAfee | Nov. 17, 1936 |
| 2,403,792 | Engelke | July 9, 1946 |